United States Patent [19]

Mohrman et al.

[11] 4,456,952

[45] Jun. 26, 1984

[54] DATA PROCESSING SYSTEM HAVING REDUNDANT CONTROL PROCESSORS FOR FAULT DETECTION

[75] Inventors: Edward A. Mohrman, Phoenix, Ariz.; Tsunetaka Umeno; Fumitaka Sato, both of Tokyo, Japan

[73] Assignees: Honeywell Information Systems Inc., Waltham, Mass.; Nippon Electric Co., Ltd., Tokyo; Tokyo Shibaura Denki Kabushiki Kaisha, Kawasaki, both of Japan

[21] Appl. No.: 204,553

[22] Filed: Nov. 6, 1980

Related U.S. Application Data

[63] Continuation-in-part of Ser. No. 14,229, Feb. 23, 1979, which is a continuation of Ser. No. 778,616, Mar. 17, 1977, abandoned.

[51] Int. Cl.$^3$ ............................................. G06F 15/16
[52] U.S. Cl. .................................................... 364/200
[58] Field of Search ... 364/200 MS File, 900 MS File, 364/134; 371/9, 68, 12

[56] References Cited

U.S. PATENT DOCUMENTS

| | | | |
|---|---|---|---|
| 3,252,149 | 5/1966 | Weida | 364/200 |
| 3,395,396 | 7/1968 | Pasternak | 364/200 |
| 3,471,686 | 10/1969 | Connell | 371/68 |
| 3,848,116 | 11/1974 | Möder | 371/9 X |
| 3,864,670 | 2/1975 | Inoue | 364/200 |
| 3,921,141 | 11/1975 | Wilber | 371/9 X |
| 4,030,074 | 6/1977 | Giorcelli | 364/200 |
| 4,049,957 | 9/1977 | Kera | 371/68 X |
| 4,099,234 | 7/1978 | Woods | 364/200 |
| 4,212,078 | 7/1980 | Games | 364/900 |
| 4,251,873 | 2/1981 | Joby | 371/9 X |

FOREIGN PATENT DOCUMENTS

| | | | |
|---|---|---|---|
| 54-19628 | 2/1979 | Japan | 371/68 |
| 55-53753 | 4/1980 | Japan | 371/68 |

*Primary Examiner*—Raulfe B. Zache
*Assistant Examiner*—David L. Clark
*Attorney, Agent, or Firm*—Oblon, Fisher, Spivak, McClelland & Maier

[57] ABSTRACT

A data processing system including a control store for storing a microprogram constituted by a number of microinstructions, first and second control processors connected in dual fashion for processing data at the same time under control of the microprogram and a cache memory for storing a part of data stored in a main memory. The system compares micro-addresses from the first and second control processors and combines the micro-addresses to form one micro-address and supplies the micro-address to the control store. The system includes an input circuit for simultaneously supplying to the first and second control processors a micro-instruction which the control store reads out upon receipt of said micro-address from the micro-address comparator, and a CPU-to-cache interface comparator including a second comparator circuit for comparing memory-addresses given from the first and second control processors, and then combines these memory-addresses to form one memory address and supplies the memory-address to the cache memory. The first and second control processors are simultaneously supplied with an operand which the cache memory reads out upon receipt of the memory-address from the CPU-to-cache interface comparator. The system is further provided with a fault processing circuit for supplying a clock stop signal to the first and second control processors when at least one of the first and second comparator circuits produces a non-coincidence signal, whereby the first and second control processors execute the microinstructions from the control store to carry out arithmetic operations, using the operand when necessary and stops executing the microinstructions upon receipt of the clock stop signal from the fault processing circuit.

5 Claims, 11 Drawing Figures

DATA PROCESSING SYSTEM HAVING REDUNDANT CONTROL PROCESSORS FOR FAULT DETECTION

CROSS REFERENCE TO A RELATED APPLICATION

This application is a continuation-in-part of application Ser. No. 14,229, filed Feb. 23, 1979 which is a continuation of application Ser. No. 778,616, filed Mar. 17, 1977 now abandoned.

BACKGROUND OF THE INVENTION

This invention relates to a data processing system which is controlled by a microprogram and which includes two control processors connected in dual fashion.

It has been strongly desired that data processing systems should be more and more reliable. Generally a data processing system is provided with various memory apparata such as a main memory, a cache memory and a control store. The data processing system is further provided with a central processing unit including typically of a control store, a control processor and a cache. The control processor reads microinstructions from the control store and operands from the main memory or cache memory, thereby to process arithmetically the operands under control of the microinstructions. The reliability of these memory apparata has been much improved by using an error detection and automatic correction circuit (hereinafter called "EDAC circuit").

If the whole data processing system is constructed in dual fashion, the system will be much more reliable, but its cost will be raised considerably. In a data processing system with only one control processor, microinstructions cannot be executed if the control processor experiences a fault. Until it is repaired, the control processor cannot carry out arithmetic operations. Availability of the whole system is thus reduced. Faults, if any, of the control processor occur in, for example, a micro-address output, a main memory interface output or an input data bus. But it is very troublesome and time-consuming to detect where in the control processor the faults have occurred because faults can take place at various parts of the control processor.

SUMMARY OF THE INVENTION

It is an object of this invention to provide a data processing system which is controlled by microprogram and in which fault-detecting ability is improved with reasonable cost.

A data processing system according to this invention is not wholly constructed in dual fashion. Only its control processor is of dual fashion. That is, the CPU has a pair of control processors, while it has a single control memory and a single cache. The outputs of the control processors are compared by at least two comparator circuits so as to check whether the control processors correctly operate. The fault-detecting ability of the data processing system is therefore enhanced. The first comparator circuit compares micro-address, and the second comparator circuit compares memory-addresses, commands and write-data. Further, a third comparator circuit may be added for comparing output data of an arithmetic logic unit (ALU), thereby to enhance considerably the fault-detecting ability.

The data processing system of this invention further comprises a fault processing circuit. The fault processing circuit stops clock supply to both the first and the second control processors when at least one of the comparator circuits produces a non-coincidence signal and then supplies an instruction to both the first and the second control processors. In reply to the instruction signal the first and second control processors start executing again the microinstruction which they were executing when the non-coincidence signal was produced. If another non-coincidence signal is generated while the microinstruction is executed for the second time, the fault processing circuit stops the first and second control processors again and then causes them to execute the same microinstruction for the third time. In similar manner the microinstruction is executed a few more times. If the comparator circuits produce no coincidence signal after the microinstruction has been executed a predetermined number of times, the first and/or second control processors are considered to have hardware faults. Then, error checking is conducted in the following way to detect which control processor has a fault. Faults in portions of the first and second control processors which are determined by parity checking can be seen from a parity error, and faults which can not be detected by parity checking can be checked through executing of a fault diagnosis program by using the first and second control processors individually. The fault processing circuit disconnects the control processor with a fault from the control store, cache memory or main memory. The remaining job is executed correctly by the processor without a fault. The rate of operation of the whole data processing system is therefore enhanced. Once disconnected from the control store, cache memory and main memory, the processor with a fault is repaired.

As mentioned above, the control store for storing the microprogram, the main memory for storing various data and the cache memory for storing a part of the data stored in the main memory are sufficiently reliable, by using, for example, an EDAC circuit. A pair of control stores, a pair of main memories or a pair of cache memories need not therefore be provided in the data processing system.

This invention can therefore provide a data processing system which can be manufactured at a low cost and which has yet an enhanced fault-detecting ability and an improved rate of operation.

Other objects and advantages of this invention will be apparent from the following description, taken in connection with the accompany drawings.

DESCRIPTION OF THE PREFERRED EMBODIMENTS

Figures 1, 3:
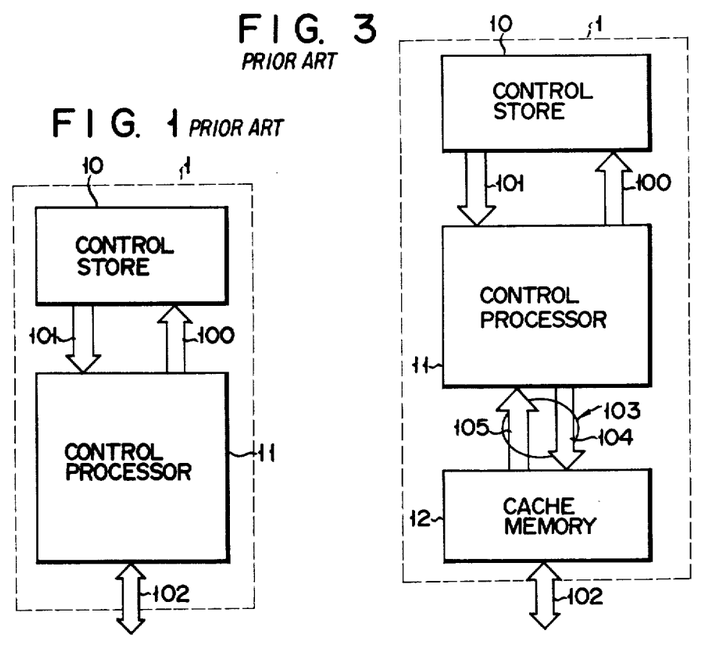
FIG. 1 is a block diagram of a conventional central processing unit which is controlled by a microprogram.
FIG. 3 is a block diagram of a central processing unit which is identical with the unit shown in FIG. 1 except that a cache memory is provided.

First, referring to FIGS. 1 to 3, the basic construction and operation of the data processing system according to this invention will be described. As shown in FIG. 1, a central processing unit (hereinafter called "CPU") 1 comprises a control store (hereinafter called "CS") 10 and a control processor (hereinafter called "CP") 11. CS 10 stores a microprogram constituted by a number of microinstructions. A microinstruction address 100 is fed from CP 11 to CS 10 to designate one of the addresses of CS 10. Then, a microinstruction is read from the designated address and is transferred to CP 11 in the form of an output 101 of CS 10. CP 11 is connected to a main memory (not shown) via a memory interface 102 and receives an operand from the main memory. CP 11 arithmetically processes the operand under control of the microinstruction read out from CS 10.

Figure 2:
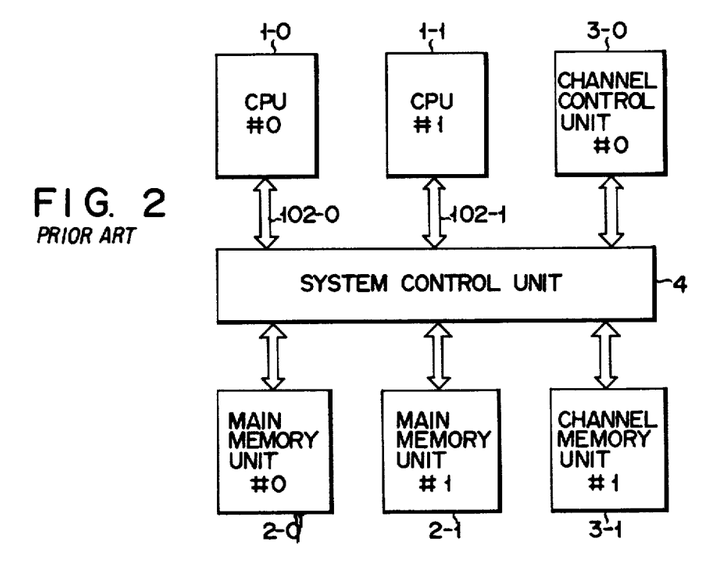
FIG. 2 is a block diagram of a dual data processing system including the central processing unit shown in FIG. 1.

FIG. 2 is a block diagram of a known dual data processing system. The system comprises two CPUs 1-0 and 1-1, two main memory units 2-0 and 2-1 and two channel control unit 3-0 and 3-1—all connected to a system control unit 4. Data are exchanged between CPUs 1-0 and 1-1 and the main memories 2-0 and 2-1 and between the channel control unit 3-0 and channel memory unit 3-1 and the main memory units 2-0 and 2-1 are effected in a specific sequence which is determined by the system control unit 4. CPUs 1-0 and 1-1 are connected to the main memory units 2-0 and 2-1 through the system control unit 4 and memory interfaces 102-0 and 102-1. The system control unit 4 controls the interaction between CPUs 1-0 and 1-1. It also controls the access of CPUs 1-0 and 1-1 to the main memory units 2-0 and 2-1.

FIG. 3 is a block diagram of another CPU 1 which is similar to CPU shown in FIG. 1 but differs in that a cache memory 12 and a cache memory interface 13 are provided between a CP 11 and a memory interface 102. An address 104 is fed from CP 11 to the cache memory 12, and a data 105 from the cache memory 12 to CP 11. The cache memory 12 is a high-speed memory for copying a part of the data which are stored in a main memory (not shown). If it stores data which CP 11 demands, the cache memory 12 supplies the data to CP 11. A CPU-main memory interface and a CPU-cache memory interface may be considered theoretically identical. The cache memory 12 is constituted by data memory portion for storing a portion of data in the main memory and directory portion to determine if a required datum is in the data portion, comparing the given address with addresses stored in the directory portion. The directory is usually implemented as an associative memory or as a set-associative memory. As the cache memory is quite well known in the industry, no details are given in this specification to make it concise.

Figure 4:
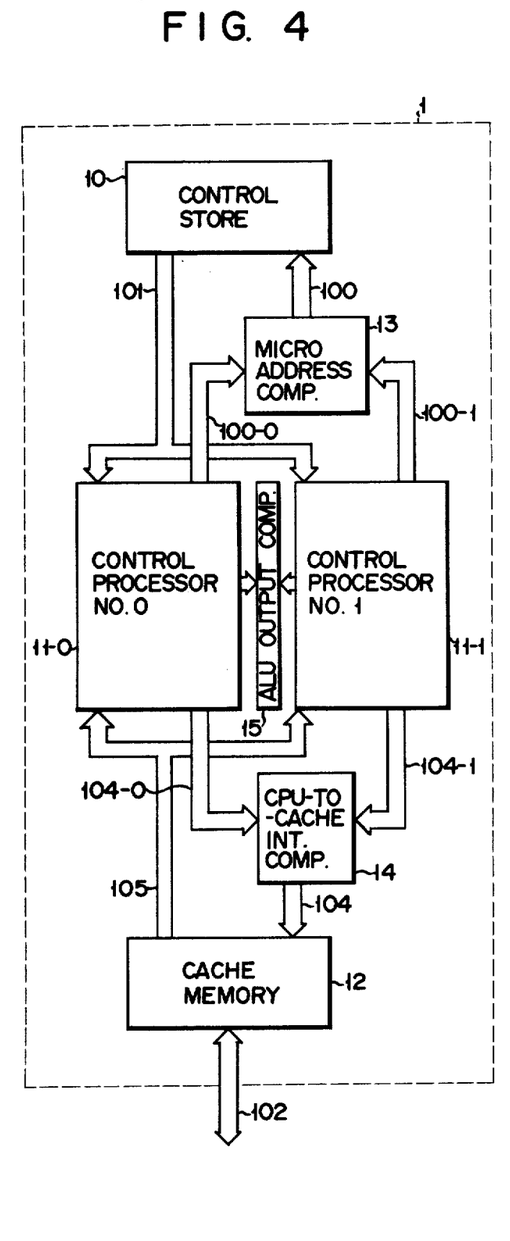
FIG. 4 is a block diagram of a central processing unit according to this invention, which is provided with a control processor in dual fashion.

FIG. 4 shows a data processing system according to this invention. Only the control processor CP 11 of its CPU is made dual. That is, CP 11 comprises two identical control processors CP 11-0 and CP 11-1. CP 11-0 and CP 11-1 carry out the same arithmetic operation at the same time. To detect where in CP 11-0 and/or CP 11-1 a fault, if any, occurs, the data processing system is provided with a plurality of comparator circuits for comparing outputs of CP 11-0 and CP 11-1. Every time CP 11-0 and CP 11-1 finish executing a microinstruction, their outputs are compared. If there is found a difference between the outputs, CP 11-0 or CP 11-1 is considered to have a hardware fault. Since the outputs of CP 11-0 are compared with the corresponding outputs of CP 11-1, it is easily detected where in CP 11-0 or CP 11-1 the fault has occurred. Now the construction of the data processing system, particulary the comparator circuits, will be described.

Figure 7:
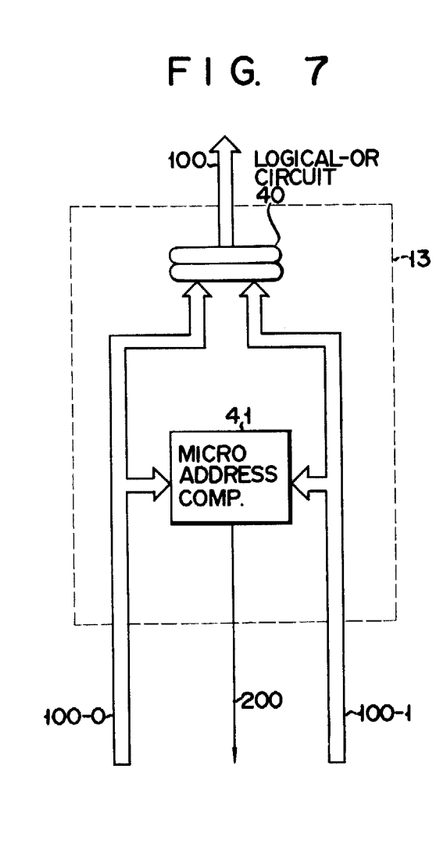
FIG. 7 is a block diagram of a micro-address comparator.
Figure 8:
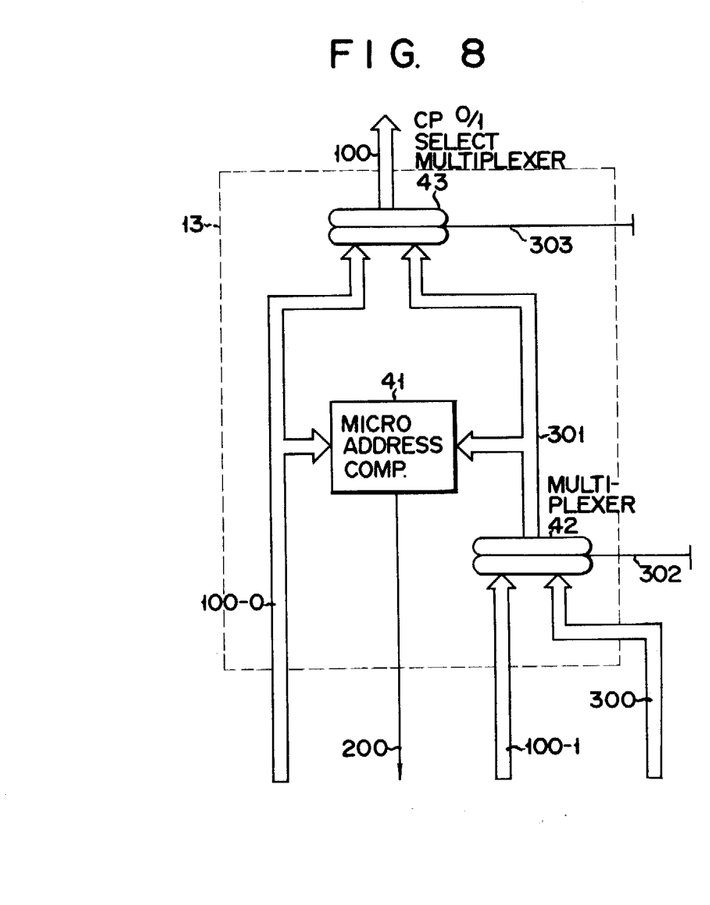
FIG. 8 is a block diagram of another micro-address comparator.

Micro-addresses from CP 11-0 and CP 11-1 are fed to a micro-address comparator 13 via signal lines 100-0 and 100-1. The comparator 13 compares the micro-addresses from CP 11-0 and CP 11-1 and combines them to form a micro-address. The micro-address thus formed is transferred to a CS 10 via a signal line 100. In response to the micro-address, CS 10 reads out a microinstruction, which is supplied to CP 11-0 and CP 11-1 at the same time through an output 101. The comparator 13 is constructed as shown in FIGS. 7 and 8 and as will be described later in detail.

CP 11-0 and CP 11-1 are coupled to the cache memory 12 through signal lines 104-0 and 104-1. Thus, the outputs of CPs 11-0 and 11-1 are compared in a CPU-to-cache interface comparator 14, and one of them or an OR signal is fed to the cache memory 12 through a signal line 104. Further, CP 11-0 and CP 11-1 each supply a memory address, and comand and write-in data to the CPU-to-cache interface comparator 14 through the signal lines 104-0 and 104-1. If the cache memory 12 stores the data demanded by CP 11-0 and CP 11-1, e.g. operands, during memory read operation, the data is read out from the cache memory 12 in response to the memory-address delivered from the comparator 14 and is transferred to CPs 11-0 and 11-1 at the same time through a signal line 105. If the cache memory 12 does not store the data demanded by CPs 11-0 and 11-1, CPU 1 is accessed to a main memory (not shown) through a memory interface 102. Thus, CPU 1 reads the data from the main memory (not shown) and supplies the data to the cache memory 12, and then the cache memory 12 transfers the data to CPs 11-0 and 11-1 at the same time through the signal line 105. Here it is not described how the cache memory 12 and the main memory are controlled, since this invention is not concerned with control of these memories.

The data processing system shown in FIG. 4 further comprises an ALU output comparator 15. The ALU output comparator 15 compares the outputs of an arithmetic logic unit (ALU) of CP 11-0 with the outputs of an arithmetic logic unit (ALU) of CP 11-1.

Figure 5:
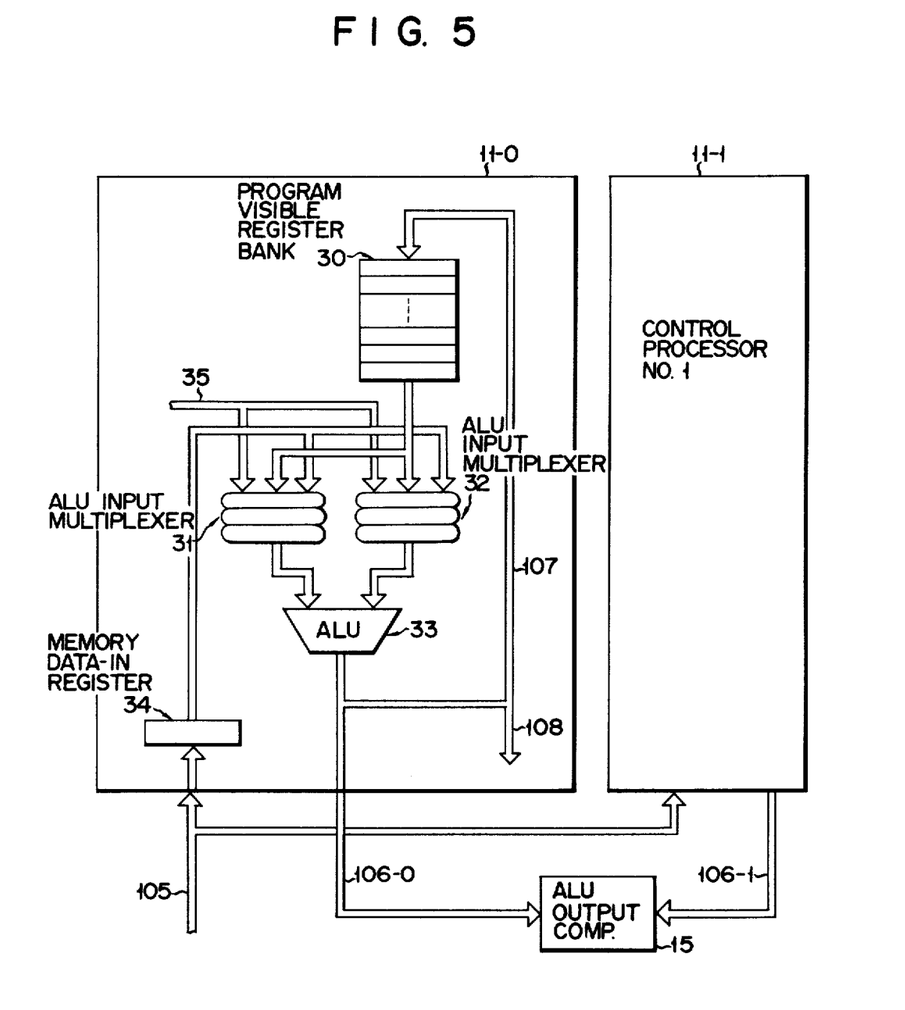
FIG. 5 illustrates data flow in the program visible register portion of the central processor shown in FIG. 4.

FIG. 5 is a block diagram of CP 11-0 of FIG. 4. CP 11-1 is of the same construction as illustrated in FIG. 5. CP 11-0 comprises a program visible register bank 30. The register bank 30 produces an output, which is supplied to input multiplexers 31 and 32 of an arithmetic logic unit (ALU) 33. CP 11-0 further comprises a memory data-in register 34 for storing an operand or the like supplied from the cache memory 12 via the signal line 105. The output of the register 34 is fed to the multiplexers 31 and 32. The multiplexers 31 and 32 receive data from the other parts of CP 11-0 via a signal line 35. The output of ALU 33 is fed to the register bank 30 via an interface 107 and, if desired, to the other parts of CP 11-0 via an interface 108. At the same time the output of ALU 33 is supplied to the ALU output comparator 15 provided outside CP 11-0. The ALU output comparator 15 compares, as mentioned above, the ALU outputs of CPs 11-0 and 11-1.

Figure 10:
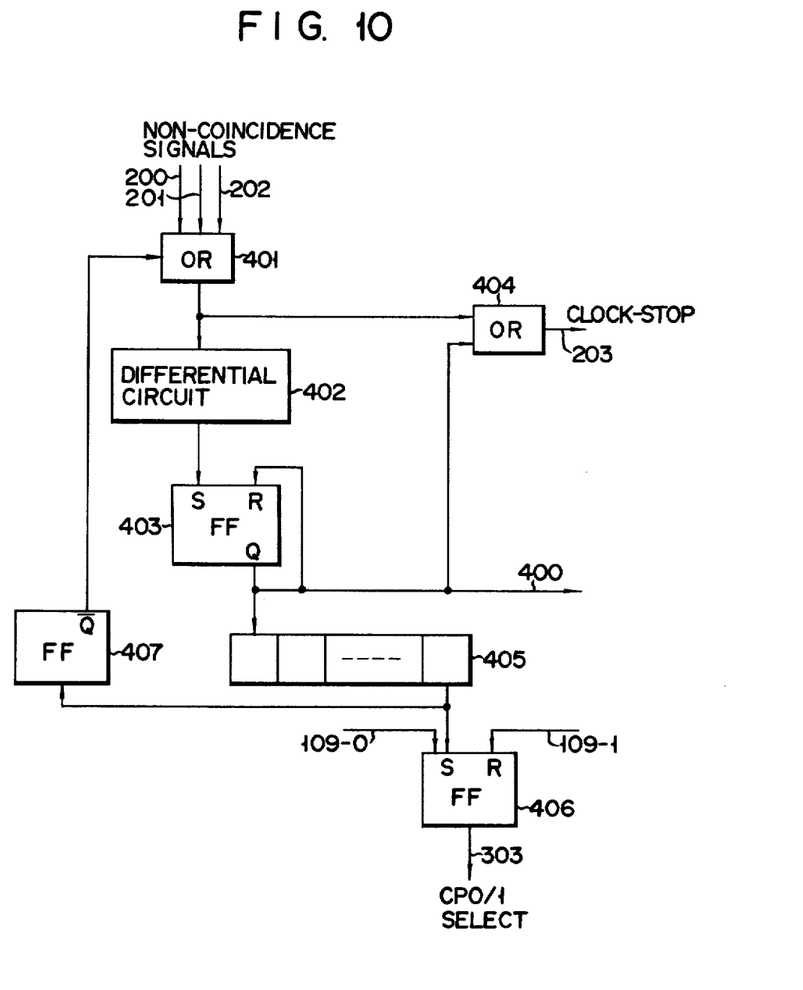
FIG. 10 is a block diagram of a fault processing circuit.

Now referring to FIG. 7 it will be described how the micro-address comparator 13 is constituted. Micro-addresses from CP 11-0 and CP 11-1 are fed to the comparator 13 via the signal lines 100-0 and 100-1, respectively. They are compared by a comparing circuit 41 included in the comparator 13. If CPs 11-0 and 11-1 operate correctly, identical micro-addresses are supplied to the circuit 41, and the circuit 41 does not produce a non-coincidence signal 200. If the part of CP 11-0 or CP 11-1, which deals with micro-addresses, has a fault, different micro-addresses are supplied to the comparing circuit 41 via the signal lines 100-0 and 100-1, and the circuit 41 supplies a non-coincidence signal 200 to a fault processing circuit 16 which is shown in FIG. 10 and which will later be described in detail. In the meantime, the micro-addresses are supplied also to a logical-OR circuit 40 through the signal lines 100-0 and 100-1. The logical-OR circuit 40 produces a logical sum of the micro-addresses, which is transferred to CS 10 via the signal line 100. The micro-address which is transferred to CS 10 is identical with the micro-addresses which are supplied through the signal lines 100-0 and 100-1 if both CP 11-0 and CP 11-1 operate correctly.

The micro-address comparator 13 may be constructed as illustrated in FIG. 8. Unlike the comparator 13 of FIG. 7, the comparator 13 of FIG. 8 is provided with fault diagnostic function. A micro-address supplied from CP 11-1 via the signal line 100-1 is temporarily stored in a multiplexer 42 and is then fed to a comparing circuit 41. The multiplexer 42 is controlled by a change-over signal 302. In normal condition the micro-address from CP 11-1 is permitted to reach an output signal line 301. The multiplexer 42 also receives a signal 300, e.g. a switch output of a maintenance panel through which any information may be delivered by a proper means. This signal 300 is selected if the change-over signal 302 is applied to the multiplexer 42. The micro-address comparator 13 is provided with another multiplexer 43 which selects the micro-address from CP 11-0 or the micro-address from CP 11-1 under control of a signal 303 supplied from the fault processing circuit 16. Thus, the micro-address from CP 11-0 or CP 11-1 is transferred to CS 10. In other words, either CP 11-0 or CP 11-1 can be disconnected from CS 10.

As described above and as illustrated in FIG. 6, CPU 1 of the system shown in FIG. 4 is of dual fashion. That is, CPU 1 comprises two identical control processors CP 11-0 and CP 11-1. The comparators 13, 14 and 15 transfer a non-coincidence signal 200, 201 or 202 to the fault processing circuit 16 when they detect a difference between the outputs of CPs 11-0 and 11-1. In response to a non-coincidence signal, the fault processing circuit 16 produces control signals 203 and 204. The control signal 203 is supplied to CP 11-0 and CP 11-1, and the control signal 204 to the cache memory 12. The signals 203 and 204 stop clock supply to CP 11-0, CP 11-1 and the cache memory 12 and causes CP 11-0, CP 11-1 and the memory 12 to retry the microinstruction which CPs 11-0 and 11-1 were executing when one of the comparators 13, 14 or 15 produces a non-coincidence signal 200, 201 or 202. The fault processing circuit 16 serves also to detect which control processor, CP 11-0 or CP 11-1, is in fault condition, and to disconnect the control processor with a fault from CS 10.

Figure 9:
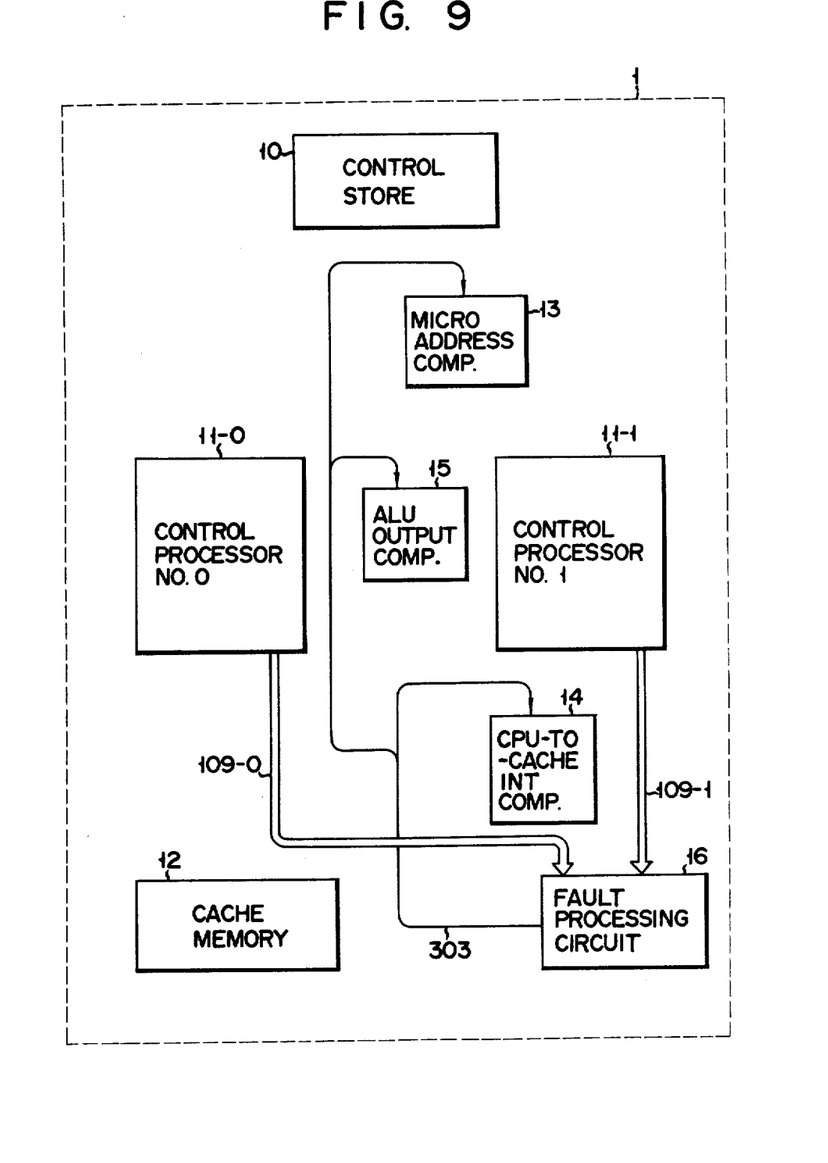
FIG. 9 illustrates how control signals flow in the control processor shown in FIG. 4 when parity error signals are fed to a troubled control processor of the central processor unit.

FIG. 9 shows how data flows in the system of FIG. 4 when parity error signals are delivered from the fault processing circuit 16. Parity error signals, if produced by parity check circuits (not shown) of CP 11-0 and CP 11-1, are transferred to the fault processing circuit 16 via a signal line 109-0 and a signal line 109-1, respectively. The fault processing circuit 16 examines the parity error signals and generates a selection signal to the comparators 13, 14 and 15 via a signal line 303, thereby to disconnect the control processor with a fault, CP 11-0 or CP 11-1, from CS 10.

Now referring to FIG. 10, the fault processing circuit 16 will be described in detail. A non-coincidence signal 200 from the micro-address comparator 13, a non-coincidence signal 201 from the CPU-to-cache interface comparator 14 and a non-coincidence signal 202 from the ALU output comparator 15 are supplied to an OR circuit 401, which produces a logical sum of these signals 200, 201 and 202. The output of OR circuit 401 is supplied to a differential circuit 402. The circuit 402 differentiates the leading edge of the output of the OR circuit 401. The output of the circuit 402 is supplied to the set terminal of a flip-flop circuit 403, thereby setting the flip-flop circuit 403. The output of the OR circuit 401 is supplied also to an OR circuit 404 to generate a clock-stop signal 203. The Q output of the flip-flop circuit 403 is supplied to the OR circuit 404 to generate a clock-stop signal 203 and further to CPs 11-0 and 11-1 via a signal line 400. Upon receipt of the Q output of the flip-flop circuit 403, an instruction counter (IC) (not shown) transfers its contents to a micro-address register (not shown) thereby to set the same at a starting address. Upon delivering the Q output, the flip-flop circuit 403 is reset.

The Q output of the flip-flop circuit 403 is also supplied to a counter 405. The counter 405 counts each occurrence of a Q outputs and thus stores data showing how many times the same microinstruction has been retried or repeatedly executed. When a predetermined number of executions of the same microinstruction are completed, the most significant digit of the counter 405 reaches a binary value "1". Then, the counter 405 produces an output signal and is reset. The output signal of the counter 405 is supplied to a flip-flop circuit 406. In response to this signal, the flip-flop circuit 406 is set or reset according to the states of the parity error signals coming via the signal lines 109-0 and 109-1, respectively. The set or reset output signal of the flip-flop 406 is supplied via the signal line 303 to the multiplexers of the comparators 13, 14 and 15 to select the control processors without fault, CP 11-0 or CP 11-1. The output of the counter 405 is supplied also to a flip-flop circuit 407 to set the same. Reset output $\bar{Q}$ of the flip-flop circuit 407 inhibits the OR circuit 401. So long as the OR circuit 401 is inhibited, the fault processing circuit 16 cannot receive a non-coincidence signal.

The known central processor unit shown in FIG. 1, which is controlled by microprogram, executes individual microinstructions, each step by step. It is well known how to control the microprogram in such a central processor unit. Here, a system for controlling microprograms is not therefore described. S. S. Husson "Microprogramming Principles & Practices", Prentice Hall, Inc. 1970, for example, discloses a microprogram control system in detail. Microinstructions to be executed by CP 11 are stored in CS 10 in the form of a microprogram. To address CS 10, a micro-address 100 is supplied to CS 10 from CP 11. CPU 1 is coupled to an external apparatus via the memory interface 102.

In the known dual data processing system shown in FIG. 2, CPU 1-0 and CPU 1-1 reads microprograms from the main memory units 2-0 and 2-1 via the memory interfaces 102-0 and 102-1, respectively and each execute a series of microinstructions included in the microprogram. While executing the microinstructions, CPU 1-0 and CPU 1-1 read, if necessary, operands from the main memory units 2-0 and 2-1 and write, if necessary, the results of the arithmetic operations of CPUs 1-0 and 1-1 into the main memory units 2-0 and 2-1.

A cache memory is often used to improve the access of CPU 1-0 to the main memory unit 2-0 or the access of CPU 1-1 to the main memory unit 2-1. The cache memory 12 of such construction as described above with reference to FIG. 3 may be used to achieve this.

To enhance the reliability of CPU 1 shown in FIGS. 1 and 3, an EDAC circuit may be used in combination with CS 10. Such an EDAC circuit as disclosed in Peterson & Weldon "Error Correcting Codes", MIT Press, 2nd edition, 1972 may be employed. Further, an EDAC circuit may be added to the main memory units 2-0 and 2-1. In this case, the reliability of all components of the data processing system but the interfaces 102-0 and 102-1 will be enhanced, too. If necessary, an EDAC circuit may be added to the cache memory 12. Moreover, parity check may be conducted on the cache memory 12. In this case, if an error is detected in it, the cache memory 12 is temporarily disconnected so that it can be repaired. While the cache memory 12 is bypassed, the main memory units are directly accessed to by CPUs.

The reliability of the data processing system of FIG. 3 will be enhanced if EDAC circuits are properly used, no matter whether or not the cache memory 12 is provided. More specifically, if CS 10 is provided with an EDAC circuit, its output 101 becomes more accurate. Further, if the interface 105 between the cache memory 12 and CP 11 is provided with an EDAC circuit, the data flow between the memory 12 and CP 11 is made more reliable. Thus, most errors, if any, in the data supplied to CP 11 are corrected. Errors, if any, in the data from CP 11 can be detected by using parity bits. If the data from CP 11 is found erroneous, CP 11 executes the same microinstruction again. In this way, the reliability of the data processing system shown in FIG. 3 can be improved. With this system, however, it is impossible to detect a fault in CP 11.

To eliminate this drawback inherent in the known CP 11, the data processing system according to this invention uses a dual CP unit which includes two identical CPs 11-0 and 11-1 as illustrated in FIG. 4. CP 11-0 and CP 11-1 effect the same arithmetic operation at the same time under control of a microprogram. Every time CPs 11-0 and 11-1 receive a microinstruction from CS 10, they transfer the next micro-address to the micro-address comparator 13. The comparator 13 compares the micro-addresses from CPs 11-0 and 11-1 to see if they are coincident or not. The output of the comparator 13 is fed to CS 10. Output signals of CPs 11-0 and 11-1 are fed to the CPU-to-cache interface comparator 14 via signal lines 104-0 and 104-1, respectively. The comparator 14 compares the output signals of CPs 11-0 and 11-1 to see if they are coincident or not, every time the cache memory 12 is accessed. The output of the comparator 14 is supplied to the cache memory 12. The output signals of CPs 11-0 and 11-1 include signals for accessing the cache memory 12, a READ command, a WRITE command, signal for accessing memory addresses and signal for accessing byte or word number. How many signals each CP delivers upon executing one microinstruction depends on the construction of the system. In a writing operation, these signals constitute a data word.

The memory-addresses delivered from CP 11-0 and CP 11-1 are transferred via the CPU-to-cache interface comparator 14 to the cache memory 12 or, in some case, to the main memory (not shown) via the interface 102. Upon receipt of an output of the comparator 14, the cache memory 14 (or, in some case, the main memory) delivers data or a macroinstruction. The microinstruction is transferred to CPs 11-0 and 11-1 via the signal line 105. CPs 11-0 and 11-1 supply CS 10 with the starting micro-address of the microinstruction through the micro-address comparator 13. Then, CS 10 starts reading a series of microinstructions. These microinstructions are fed to CPs 11-0 and 11-1 one after another via the signal line 101. CPs 11-0 and 11-1 execute the microinstructions to carry out arithmetic operations. During the arithmetic operations, an operand is read out from the cache memory 12 (or, in some case, the main memory) and supplied to CPs 11-0 and 11-1, if necessary. The data showing the results of the arithmetic operations are written into both the cache memory 12 and the main memory via the CPU-to-cache interface comparator 14 and also into the program visible registers of CPs 11-0 and 11-1.

Since all the outputs of CP 11-0 are compared with all the outputs of CP 11-1 by the comparators 13 and 14, it can be detected whether CPs 11-0 and 11-1 are correctly operating. Referring to the embodiment of FIG. 5, it will be described how to detect whether or not CPs 11-0 and 11-1 are functioning correctly.

Various arithmetic operations are defined by microinstructions. A desired result is obtained by feeding each CP with inputs which are designated to both the operand and operator of ALU 33. To arithmetically process an operand read out from the cache memory 12 and the contents of the program visible register bank 30, the operand is fed to the memory data-in register 34 via the interface 105 and is temporarily stored in the register 34. The operand is then fed to ALU 33 via the ALU input multiplexer 31. The data in the register bank 30 is read out and supplied to ALU 33 via the ALU input multiplexer 32 when it is designated by a macro or micro instruction word. ALU 33 effects the arithmetic operation designated by the macro or micro instruction word. The result of the arithmetic operation is or is not stored into, for example, the register bank 30 via the signal line 107 according to the macro or micro instruction word. The result may also be fed to the other registers of each CP via a signal line 108. The result is delivered outside each CP through a memory output register (not shown) and through, for example, the signal line 104-0 or 104-1 shown in FIG. 4.

So long as CPs 11-0 and 11-1 have no fault, they carry out arithmetic operations in the above-mentioned way. The results of the arithmetic operations, i.e. the outputs of ALUs 33 of CPs 11-0 and 11-1 are fed to the ALU output comparator 15 via signal lines 106-0 and 106-1, respectively. The ALU output comparator 15 compares the outputs of CP 11-0 and CP 11-1 to check whether they are coincident. Data from the other registers of each CP may be supplied to the input multiplexers 31 and 32 of ALU 33. If one of CPs 11-0 and 11-1 fails, only the other CP carries our arithmetic operations. In this case, the ALU output comparator 15 need not operate. The ALU output comparator 15 therefore serves to detect whether CP 11-0 and CP 11-1 are correctly functioning.

Referring to FIG. 7 again, it will be described how data and signals flow in the micro-address comparator 13. Micro-addresses from CPs 11-0 and 11-1 are supplied to the logical-OR circuit 40 via the signal lines 100-0 and 100-1, respectively. The logical-OR circuit 40 produces a logical sum of the micro-addresses, which is fed to CP 10. At the same time, the micro-address comparator 41 compares the micro-addresses from CPs 11-0 and 11-1 to detect whether they are coincident or not. If the micro-addresses are found not identical, the comparator produces a non-coincidence signal 200. It should be noted here that the CPU-to-cache interface comparator 14 shown in FIG. 4 is similar in construction to the micro-address comparator 13. The ALU output comparator 15, which compares only the outputs of ALUs of CPs 11-0 and 11-1, need not be provided with a circuit equivalent to the logical-OR circuit 40 of the micro-address comparator 13.

Figure 6:
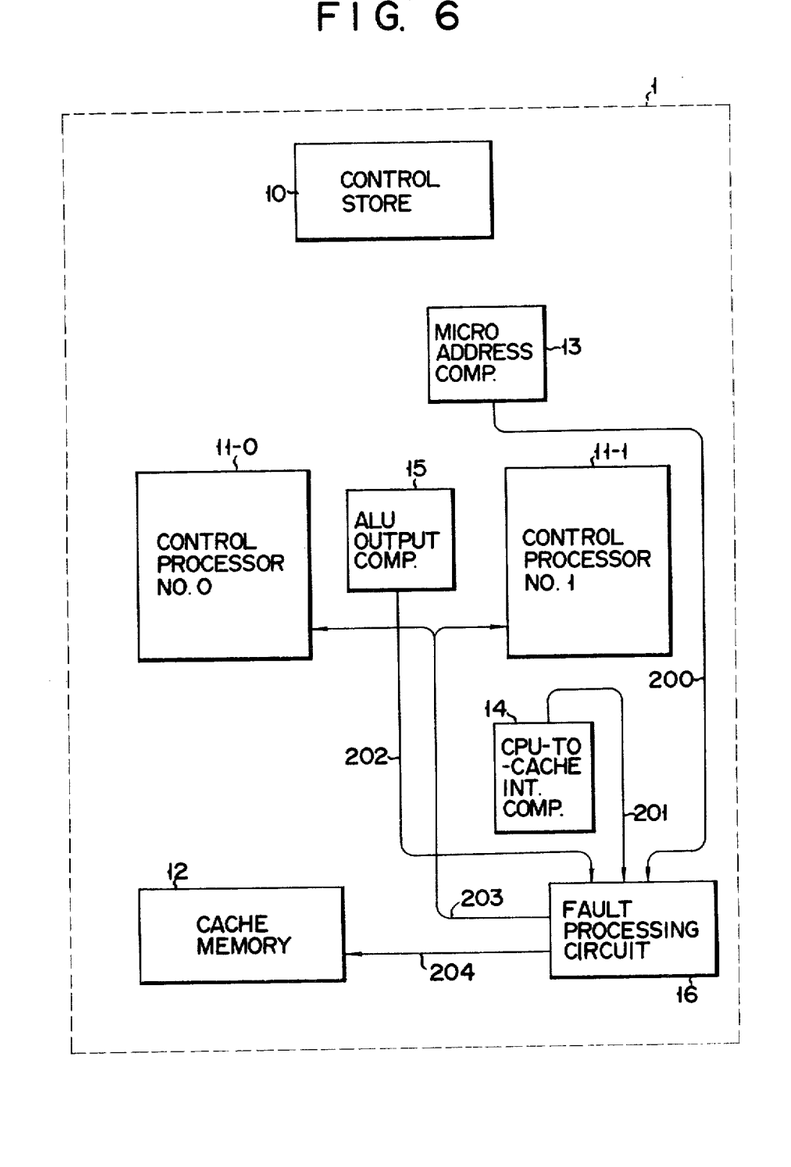
FIG. 6 illustrates control flow in the central processor shown in FIG. 4.

Referring to FIG. 6, it will now be described how data flow in CPU 1. If non-coincidence signals 200, 201 and 202 are produced by the comparators 13, 14 and 15, they are fed to the fault processing circuit 16. One of these non-coincidence signals 200, 201 and 202 indicates that either CP 11-0 or CP 11-1 has a temporary fault or a permanent trouble. Upon receipt of a non-coincidence signal, the fault processing circuit 16 produces control signals 203 and 204. The signal 203 is supplied to CPs 11-0 and 11-1, and the signal 204 to the cache memory 12. In response to the signal 203, CPs 11-0 and 11-1 stop writing erroneous data into the program visible register banks 30. Similarly, in response to the control signal 204 the cache memory 12 stops receiving erroneous data. The cache memory 12 and the register banks 30 hold correct data. Both CPs 11-0 and 11-1 then start executing again the microinstruction which they were executing when the comparator 13, 14 or 15 produces the non-coincidence signal 200, 201 or 202. If another non-coincidence signal is generated when CPs 11-0 and 11-1 finish executing the microinstruction for the second time, the fault processing circuit 16 supplies signals 203 and 204 to CPs 11-0 and 11-1 and the cache memory 12. Then, CPs 11-0 and 11-1 start executing the same microinstruction for the third time. In this manner, the same microinstruction is executed a predetermined number of times. If a non-coincidence signal is generated even after the instruction has been executed the predetermined number of times, the fault is considered a permanent one, and the CP with the fault is disconnected from CS 10. Thus, only the CP without fault is operated until the other CP is repaired.

The main data bus lines and output lines of the program visible register banks 30 of CPs 11-0 and 11-1 are connected to the fault processing circuit 16. The register banks 30 are each provided with a parity check circuit (not shown). The fault processing circuit 16 can therefore detect which CP has a fault, CP 11-0 or CP 11-1, according to parity error signals delivered from CPs 11-0 and 11-1. To supply parity error signals to the fault processing circuit 16, the signal lines 109-0 and 109-1 are used as illustrated in FIG. 9.

Figure 11:
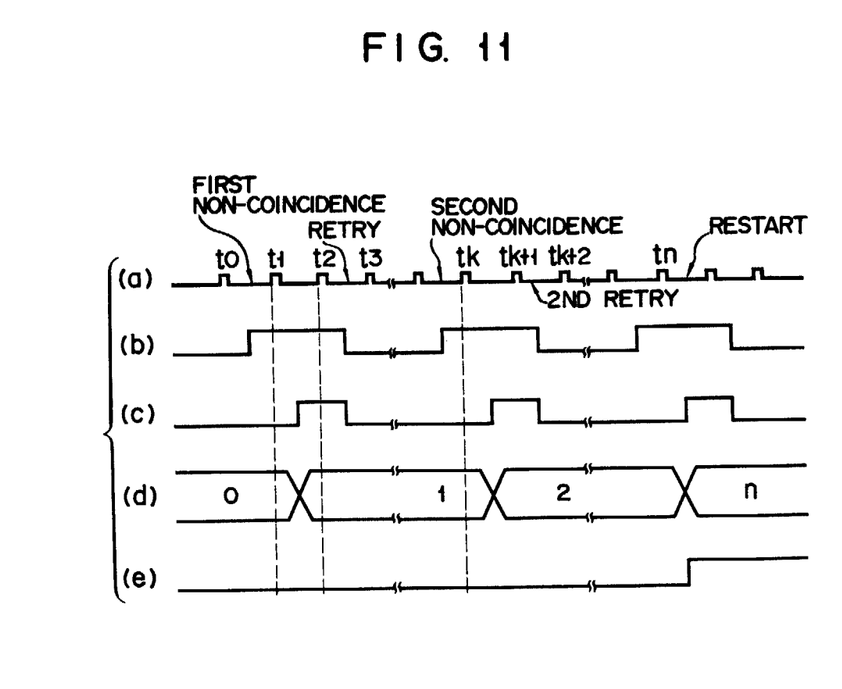
FIG. 11 is a time chart showing the operation timings of the fault processing circuit shown in FIG. 10.

Now referring to the timing chart of FIG. 11, it will be described how the fault processing circuit 16 operates, which is constructed as described above and as illustrated in FIG. 10.

When a non-coincidence signal is fed from the comparator 13, 14 or 15 to the OR circuit 401, a clock-stop signal is supplied to CPs 11-0 and 11-1 via the OR circuit 404. At the same time the flip-flop circuit 403 is set by a clock signal at time $t_1$. When the Q output 400 of the flip-flop 403 is obtained at time $t_2$, the starting address of the microinstruction which CPs 11-0 and 11-1 were executing when the non-coincidence signal was produced is written into a micro-address register, using an instruction counter. The counter 405 advances one step in response to the Q output 400 of the flip-flop 403. At time $t_3$, CPs 11-0 and 11-1 start executing the microinstruction for the second time. If no non-coincidence signal is produced when CPs 11-0 and 11-1 finish executing the microinstruction for the second time, it is considered that no fault has taken place in CP 11-0 or CP 11-1. Thus, CPs 11-0 and 11-1 execute the next microinstruction. However, if another non-coincidence signal is detected by the fault processing circuit 16 when CPs 11-0 and 11-1 finish executing the microinstruction for the second time, the same microinstruction is executed repeatedly at time $t_k$, time $t_{k+1}$, time $t_{k+2}$, . . . As the microinstruction is executed repeatedly, the counter 406 advances step by step. When the counter 405 reaches a predetermined count value, it produces an output.

The output of the counter 405 sets the flip-flop circuit 406. The flip-flop circuit 406 is set also by a parity error signal supplied via the signal line 109-0, and it is reset by a parity error signal supplied via the signal line 109-1. More precisely, if a fault occurs in CP 11-0, a parity error signal is supplied via the signal line 109-0 to set the flip-flop circuit 406. If a fault takes place in CP 11-1, a parity error signal is supplied via the signal line 109-1 to reset the flip-flop circuit 406. The output signal 303 of the flip-flop circuit 406 is supplied to the micro-address comparator 13, the CPU-to-cache interface comparator 14 and the ALU output comparator 15. In response to the signal 303 the comparator 13 and 14 select the CP without a fault. It will later be described how the comparator 15 responds to the signal 303.

The output of the counter 405 is supplied also to the flip-flop circuit 407 to set the same. The output of the flip-flop circuit 407 inhibits the OR circuit 401. So long as it is inhibited, the OR circuit 401 does not produce an output if it receives a non-coincidence signal, and the fault processing circuit 16 does not therefore operate.

As mentioned before, unlike comparator 13 shown in FIG. 7, the micro-address comparator 13 of FIG. 8 is provided with a fault diagnostic function. Now referring to FIG. 8 again, it will be described how the comparator 15 responds to the output signal 303 of the flip-flop circuit 406 of the fault processing circuit 16. The comparing circuit 41 receives micro-addresses which have been delivered from CPs 11-0 and 11-1 via the signal lines 100-0 and 100-1, respectively. The micro-address from CP 11-1 are supplied to the multiplexer 42 and then to the signal line 301. It will later be described how to use the multiplexer 42. If it detects a difference between the micro-addresses from CPs 11-0 and 11-1, the comparing circuit 41 produces a non-coincidence signal 200. The micro-addresses are supplied also to the select multiplexer 43. The multiplexer 43 selects one of the micro-addresses, which is delivered outside the micro-address comparator 13 via the signal line 100. The micro-address from CP 11-1 is selected when the multiplexer 43 receives an output 303 of the flip-flop circuit 406, and the micro-address from CP 11-0 is selected when the multiplexer 43 receives no output 303. Thus, CP 11-0 is selected so long as the fault processing circuit 16 detects no non-coincidence signal. Upon detecting a predetermined number of non-coincidence signals despite the repeated execution of the same microinstruction, the fault processing circuit 16 alters the logical level of the signal 303 from "1" to "0" if a parity error signal appears on the signal line 109-0 to show that a fault has occurred in CP 11-0. The logical level of the signal 303 remains "1" so long as CP 11-1 or CPs 11-0 and 11-1 are normally operating. The comparators 14 and 15 are similar in construction to the micro-address comparator 13 and have each a select multiplexer. The output signal 303 of the flip-flop circuit 406 is supplied to the select multiplexers of the comparators 14 and 15, too, thereby to select CP 11-1.

If a fault is found in CP 11-0, CP 11-0 is disconnected from CS 10 and then repaired. While CP 11-0 is disconnected from CS 10, CP 11-1 keeps processing data. For this reason, the rate of operation of the whole data processing system is not lowered.

The multiplexer 42 is controlled by a change-over signal 302 as mentioned before. To the multiplexer 42 two data are supplied, the micro-address delivered from CP 11-1 via the signal line 100-1 and an output 300 of a maintenance panel or register (not shown). Desired data have been added to the output signal 300 by switching means. The multiplexer 42 selects the signal 300 when it receives the change-over signal 302. In other words, the change-over signal 302 prevents the micro-address from CP 11-1 from reaching the comparing circuit 41 or the select multiplexer 43. The multiplexer 42 therefore has a so-called "address stop function".

As described above, in the data processing system according to this invention only the control processor unit is made in dual fashion because it would become extremely expensive if provided with an error checking function. More precisely, the control processor unit includes two identical control processors, thereby elevating the reliability of the system. A plurality of comparators may be provided to check whether both control processors correctly operate. Further, should a fault occur in one of the control processors, the other control processor can operate to carry out arithmetic operations. This prevents the rate of operation of the whole system from degrading.

What we claim is:

1. a partially redundant data processing system comprising:

a control store for storing a microprogram constituted by a plurality of microinstructions;

redundant first and second control processors coupled to said control store for commonly receiving microinstructions from said control store and for simultaneously executing identical data processing under control of said microinstructions, the first and second control processors delivering predetermined microinstructions and memory addresses each time said first and second control processors receive microinstructions from said control store;

microinstruction input means for simultaneously supplying to said first and second control processors microinstructions read out from said control store;

a cache memory for storing a copy of a part of data stored in a main memory;

a first comparator circuit connected to said first and second control processors, for comparing micro-addresses delivered from said first and second control processors to deliver a first non-coincidence signal when the micro-addresses do not coincide with each other;

micro-address output means including a first multiplexer for selecting one of said micro-addresses delivered from said first and second control processors and supplying the selected one micro-address to said control store;

a second comparator circuit connected between said cache memory and said first and second control processors, for comparing memory addresses delivered from said first and second control processors to deliver a second non-coincidence signal when the memory addresses do not coincide with each other;

CPU-to-cache interface means including a second multiplexer for selecting one of said memory addresses delivered from said first and second control processors and supplying the selected one memory address to said cache memory;

data input means for simultaneously supplying data read out from said cache memory to said first and second control processors; and a fault processing circuit connected to receive the first and second non-coincidence signals of said first and second comparator circuits and connected to said first and second control processors for supplying a clock stop signal to said first and second control processors when a non-coincidence signal is delivered from at least one of said first and second comparator circuits so as to stop temporarily execution of said microinstructions at said first and second control processors.

2. A data processing system according to claim 1, wherein said first and second control processors retry for a predetermined number of times a microinstruction which has been executed when a non-coincidence signal is delivered from at least one of said first and second comparator circuits, said system comprising:

means for transferring parity error signals delivered from said first and second control processors to said fault processing circuit; and said fault processing circuit comprising, means for delivering selection signals to be used for separating from said control store and cache memory one of the first and second control processors in response to a parity error signal delivered from said one of said first and second control processors and a non-coincidence signal supplied from at least one of said first and second comparator circuits which is generated even after the microinstruction is retried for said predetermined number of times.

3. A data processing system according to claim 1, wherein said first multiplexer delivers to said control store either one of the micro-addresses supplied from said first and second control processors upon receipt of a selection signal obtained from said fault processing circuit.

4. A data processing system according to claim 1, wherein said second multiplexer delivers to said cache memory either one of the memory addresses supplied from said first and second control processors upon receipt of a selection signal obtained from said fault processing circuit.

5. A data processing system according to claim 1, comprising first and second arithmetic logic units respectively provided in said first and second control processors, and a third comparator circuit for comparing outputs of said first and second arithmetic logic units.

* * * * *